Figure 6:
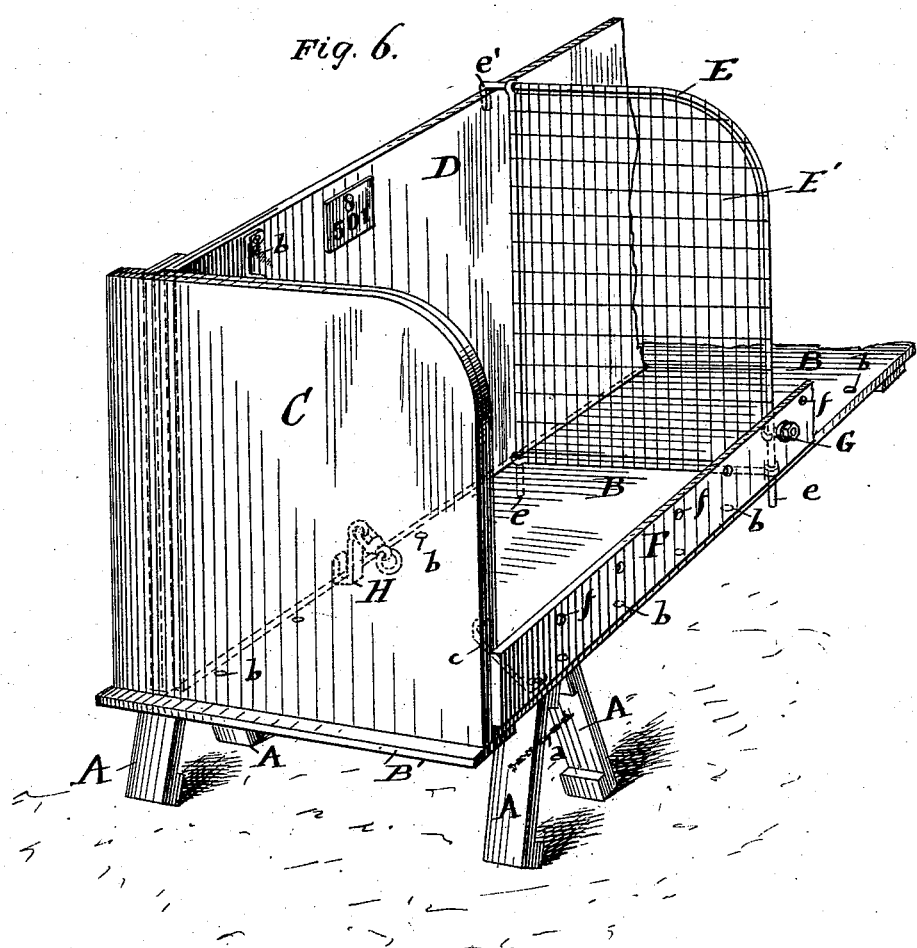

(No Model.)   2 Sheets—Sheet 1.
C. A. CRUFT.
KNOCKDOWN BENCH FOR DOGS, &c.
No. 408,464.   Patented Aug. 6, 1889.
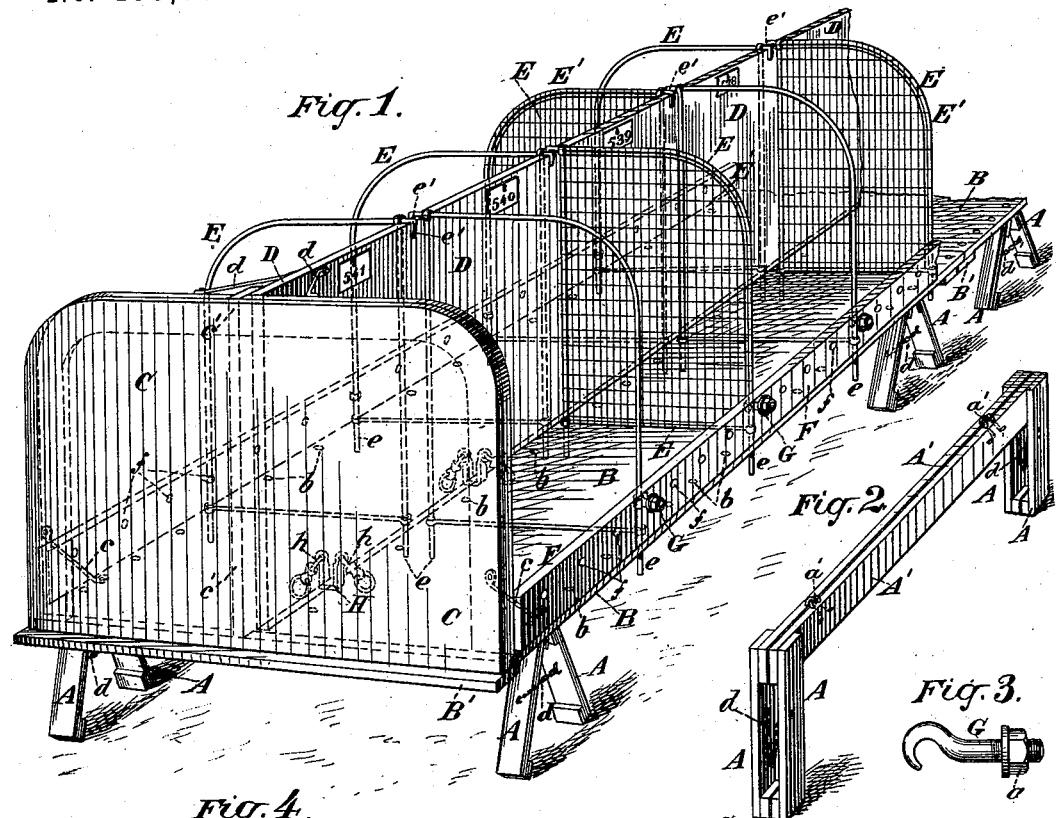
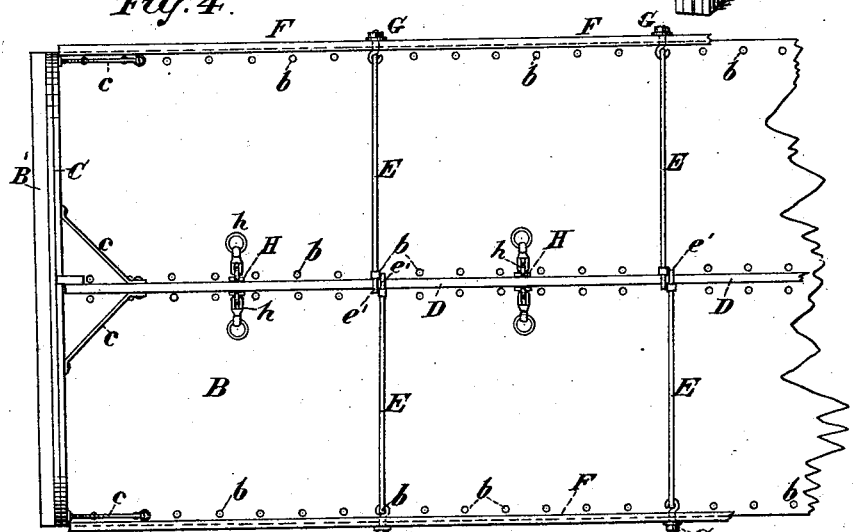
Witnesses   Inventor
John Becker   Charles A. Cruft
Charles E. Johnson   by James Law
   Attorney (No Model.) 2 Sheets—Sheet 2.

C. A. CRUFT.
KNOCKDOWN BENCH FOR DOGS, &c.

No. 408,464. Patented Aug. 6, 1889.

Witnesses
John Becker
Charles E. Johnson

Inventor
Charles A. Cruft
by James Law
Attorney

UNITED STATES PATENT OFFICE.

CHARLES A. CRUFT, OF LONDON, ENGLAND, ASSIGNOR TO THE SPRATTS PATENT, (AMERICA,) LIMITED, OF NEW YORK, N. Y.

KNOCKDOWN BENCH FOR DOGS, &c.

SPECIFICATION forming part of Letters Patent No. 408,464, dated August 6, 1889.

Application filed October 16, 1888. Serial No. 288,278. (No model.)

*To all whom it may concern:*

Be it known that I, CHARLES A. CRUFT, a citizen of Great Britain, and a resident of London, England, have invented certain new and useful Improvements in Knockdown Benches for Dogs and other Animals, of which the following is a full, clear, and exact description, reference being had to the accompanying drawings, making a part of this specification.

My improvement relates more particularly to benches or temporary stalls for exhibiting dogs or other small animals at fairs and shows; and it consists, essentially, of a bench divided into several compartments so constructed and arranged that it can be readily taken apart and packed in small compass, so as to be easily transported from place to place and occupy but little space in storage, and can be easily and quickly put together and made ready for the animals without injuring or interfering in any manner with the room or building in which it is placed; and it furthermore consists in forming the partitions between the several stalls of wire-netting or other open material, so as to obtain perfect ventilation and a good view of the animals.

In the drawings illustrating my invention, in which like letters indicate like parts, Figure 1 is a view of my improved bench in position ready for the dogs, showing some of the partitions between the stalls made of wire-netting. Fig. 2 is a view of one of the horses or supports for the bench folded ready for transportation or storage. Fig. 3 is a view of the hook or fastening for securing the front board to the frame of the partition. Fig. 4 is a top view of the bench looking down on the floor of the same. Fig. 5 is an end view of a portion of the bench, partly in section, showing the method of securing the front board and the rings to which the dogs are fastened. Fig. 6 is a view of a modified construction of my bench where the bench is intended to be placed against the wall of the room.

In its usual construction, as is shown more clearly in Fig. 1, my improved benching consists, essentially, of a series of stalls arranged side by side and back to back, formed by a central partition extending lengthwise of the bench and forming the backs of the several stalls, and by side partitions or frames supporting the central partition, and having a floor resting on movable horses or supports some distance from the ground or floor of the room. These horses or supports A, Figs. 1 and 2, consist of the legs A A, secured at right angles to the horizontal strips A' A'. The latter strips A' are hinged at a', Fig. 2, or fastened together in such a manner that the lower ends of the legs A can be spread apart, as shown in Fig. 1, and the horse thus made to stand firmly and steadily and support any weight put upon it. A small chain a between the legs A A prevents their spreading apart too far, and thus interfering with the stability of the horse. The horse or support for the bench thus constructed is very simple and light and may be readily moved about, and when not in use can be folded, as shown in Fig. 2, so as to occupy but little space. On these horses or supports A is placed the flooring B of the bench. This flooring is formed in sections, and can be constructed in any manner desired. In the double bench shown in Fig. 1 each section is made wide enough to form the two stalls, placed back to back, as will be seen from Figs. 1 and 2, and is of any length found convenient in handling, the sections being constructed so that the ends can be placed close together when it is desired to extend the benching for any length, the horses A being arranged under the ends of each section, as will be understood from Fig. 1.

At the ends of the bench are the end pieces C. These ends are usually solid, so as to be firm and strong, being constructed of wood or sheet metal, as desired, and extend across the width of the bench and are erected at right angles to the floor, to which they are fastened by the braces c. The end pieces C may rest on the surface of the floor, or in a groove formed in the latter, or on a cleat B', so as to rest against the edge of the floor, as will be seen in Fig. 1. Along the center of the double bench (shown in Fig. 1) and forming the backs of the several stalls is the central partition D. This partition, which is solid, is usually constructed of wood, but may be made of any suitable material—as sheet metal—and is formed in sections convenient for handling.

The partition D rests on the floor of the bench and is secured and held erect at right angles to the latter by the end pieces C by means of the braces c and cleats c', arranged on the ends C on each side of the partition, as seen in Figs. 1 and 4, either one or both, and by the side frames or partitions E, as hereinafter described. In the floor B along each edge and along the center on each side of the central partition D is a series or line of small holes b, arranged at regular distances from each other. Through these holes b extend the lower ends of the frames or side partitions E of the bench. These side partitions, as will be understood more particularly from Figs. 1 and 6, extend from the central partition D or back of the stalls to the outer edge of the bench and at right angles to the partition D or parallel to the end pieces C. The frame E of the partitions, which may be constructed of stout wire or metallic rods of suitable thickness, is formed so as to rest close against the back or partition D and on the floor B and extend vertically upward from the edge of the bench a sufficient distance to properly separate the stalls, as will be understood from Fig. 1.

The vertical bars of the frame E project or extend below the partition or lower horizontal bar of the frame, as shown at e, and in erecting the frame or partition on the bench these ends e are inserted in the holes b in the floor along the outer edge of the bench and next to the partition or back D, as will be seen in Figs. 1, 5, and 6, and as there are a number of these holes b the partitions or frames E may be placed at any distance from each other desired to form a wide or narrow stall. The top bar of the frame extends back a short distance and is bent down at right angles to form the hook e'. This hook e' fits over the top of the central partition or back of the stalls D, Figs. 1 and 6, and as the hook is constructed to tightly grasp the partition the frame E assists to hold the partition or back D, and at the same time is held by the latter, as will be understood from Figs. 1 and 6. These side partitions between the stalls are preferably made of wire-netting, as shown at E', which is secured to the frame E; but if a solid partition is desired any light material—as sheet iron—may be employed; or where it is not required to separate the stalls the frame E alone is used, as is shown in Fig. 1, to hold and secure the back or partition D and strengthen the bench.

Extending along the bench in front of the stalls is a narrow front board F, Figs. 1, 4, 5, and 6, which rests on the edge of the floor B of the bench and is secured to the front bars of the frames E. This board F is provided with a line or series of holes f, Figs. 1 and 6, which correspond in position when the board is in place on the bench with the holes b in the floor B. Through these holes f are inserted the shanks of the hooks G, (shown more at large in Fig. 3,) and the board F having been placed on the edge of the floor, the hooks G are put around the front bars of the frames E and the nuts g screwed on the shanks and against the board, so as to draw the board and hold it firmly against the frames, as will be understood from Figs. 1, 4, 5, and 6. The front board F, instead of being solid, as shown, may be partially open, and may be secured to the bench in any convenient manner, although I prefer the method above described. As the frames E are thus held in place by the projections e, which pass through the holes b in the floor of the bench and grasp the top of the central partition or back D by the hooks e', and are held and secured in front by the hooks G on the front board F, the whole bench is rendered firm and steady, and when not too large may be moved about at pleasure. Any number of the side frames or partitions E may be used, depending on the length of the benching desired, and the one bench may be extended indefinitely by multiplying the several parts.

At H, Figs. 1, 4, 5, and 6, is shown a convenient method of securing the ring to which the chain by which the dog is fastened is attached. As will be seen, particularly in Fig. 5, a piece of iron H is bent so as to form three sides of a parallelogram, so as to fit under the central partition D, and to the upper or open ends h of the iron are secured the rings to which the dog-chain is attached. When the central partition D is erected on the bench, these irons H are placed under the partition, so as to be in the center of each stall, as shown in Fig. 1. As will readily be understood from the drawings, the rings for the dog-chain are thus firmly secured to the bench at the back of the stall without being driven or screwed or otherwise permanently attached to the same, and may be readily moved to the correct place on the bench, and are easily removed when the bench is taken down.

My improved bench thus constructed can be readily and quickly erected in any suitable place in the following manner: The horses or supports A having been put in position, the floor-sections B are placed on the same. The end pieces C are then erected and secured to the floor by the braces c or otherwise and the central partition D placed along the center of the bench, with the iron H under the same, and fastened to the end pieces C. The frames E or side partitions are next erected in the holes b wherever desired, according to the width of the stalls needed, with the hooks e' over the top of the partition D. The front board F is then placed in front of the stalls and secured by the hooks G to the frames E, when the whole bench will be completely erected and ready for the dogs.

The bench can be as easily and quickly taken down and apart and the various parts packed together in small compass for transportation or storage.

In Fig. 6 is illustrated a modified form of the bench shown in Fig. 1, and is designed to be used next to the wall or side of the room, where but one line of stalls is practicable. This single bench is merely half or a part of the double bench shown in Fig. 1, the floor-section B being just wide enough to form a single stall and the part D forming the back of the bench. This single bench is constructed and put together in the same manner as the double bench before described.

As the side partitions between the several stalls are formed of wire-netting or other similar material, perfect ventilation and circulation of the air through the stalls are obtained, and moreover all the dogs contained therein may be more readily seen. Both this double and single bench may rest on any form of support other than the horses A (shown in the drawings) that is found practicable and desirable.

My improved benching can thus be erected in any suitable room in a few minutes without the necessity of nailing or screwing the parts together, and as the bench rests on the horses or supports which are placed on the floor, and is not attached in any manner to the building, it is put up and taken down without injuring the room or building in any manner.

I do not wish to confine myself to the exact manner of fastening the several parts of the bench described above, but they may be connected together in any similar manner.

What I claim as new is—

1. A knockdown bench for animals, consisting of the floor B, the ends C, the partition or back D, the side partitions E, and the front board F, erected on the floor B and connected together, substantially as described, and for the purpose set forth.

2. The bench for animals, consisting of the floor B, having the holes $b$, the ends C, and central partition D, erected on the floor B, the partitions E, connected to the floor B by the holes $b$ and to the partition D, and the front board F, secured to the partitions E, all constructed and connected together substantially as described, and for the purpose set forth.

3. The bench for animals, consisting of the floor B, having the holes $b$, the ends C, and partition D, erected on the floor B, the partitions E, connected to the floor B by the holes $b$ and to the partition D by the hooks $e'$, and the front board F, secured to the partitions E by the hook G and the ring-clamp H, all constructed and connected together substantially as described and supported by the horses A A', as and for the purpose set forth.

4. In a knockdown bench for animals, the combination, with the floor B, central partition or back D, and front board F, of the wire partitions E, as and for the purposes set forth.

5. In a bench for exhibiting animals, having stalls divided by partitions, the attaching device H, formed to lie under and on each side of the partition and having the ends $h$, adapted to receive the chain-rings, and thereby fastened to the bench, as and for the purpose set forth.

6. In a knockdown bench for animals, the combination of the floor B, ends C, partition or back D, and movable partitions E, arranged and connected together substantially as and for the purpose set forth.

Signed at the consulate-general of the United States of America at London, England, this 10th day of September, A. D. 1888.

CHARLES A. CRUFT.

Witnesses:
MARTIN B. WALLER,
*Vice and Deputy Consul-General, U. S. A., London.*
S. F. CHAMBERLAIN,
*Clerk.*